Patented Mar. 1, 1927.

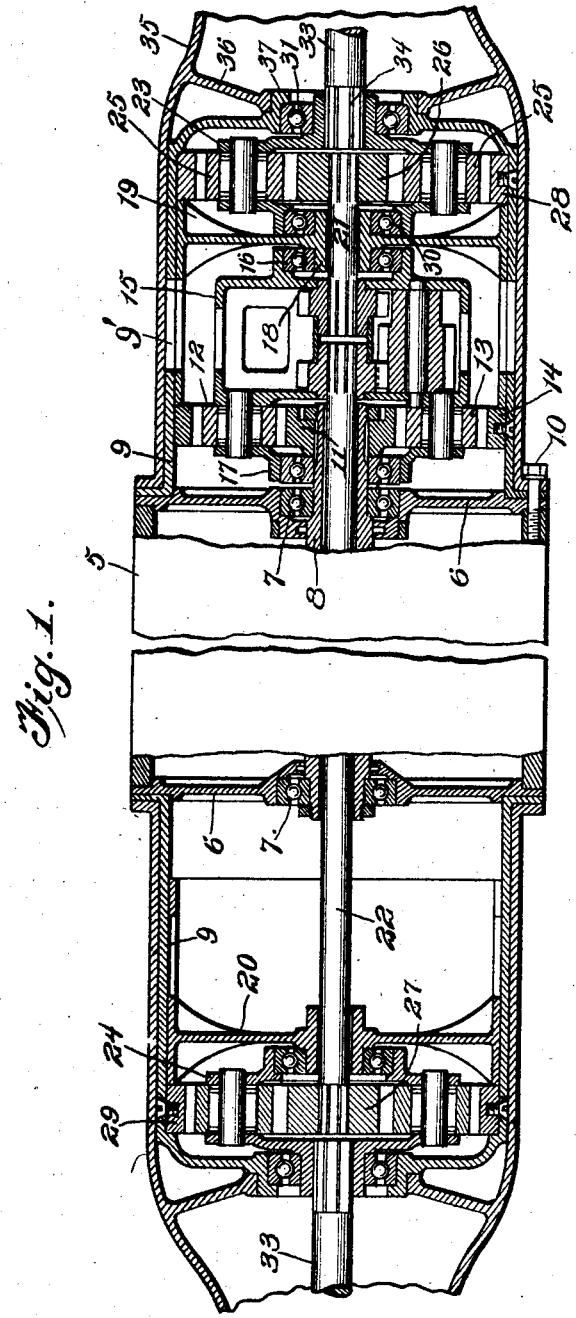

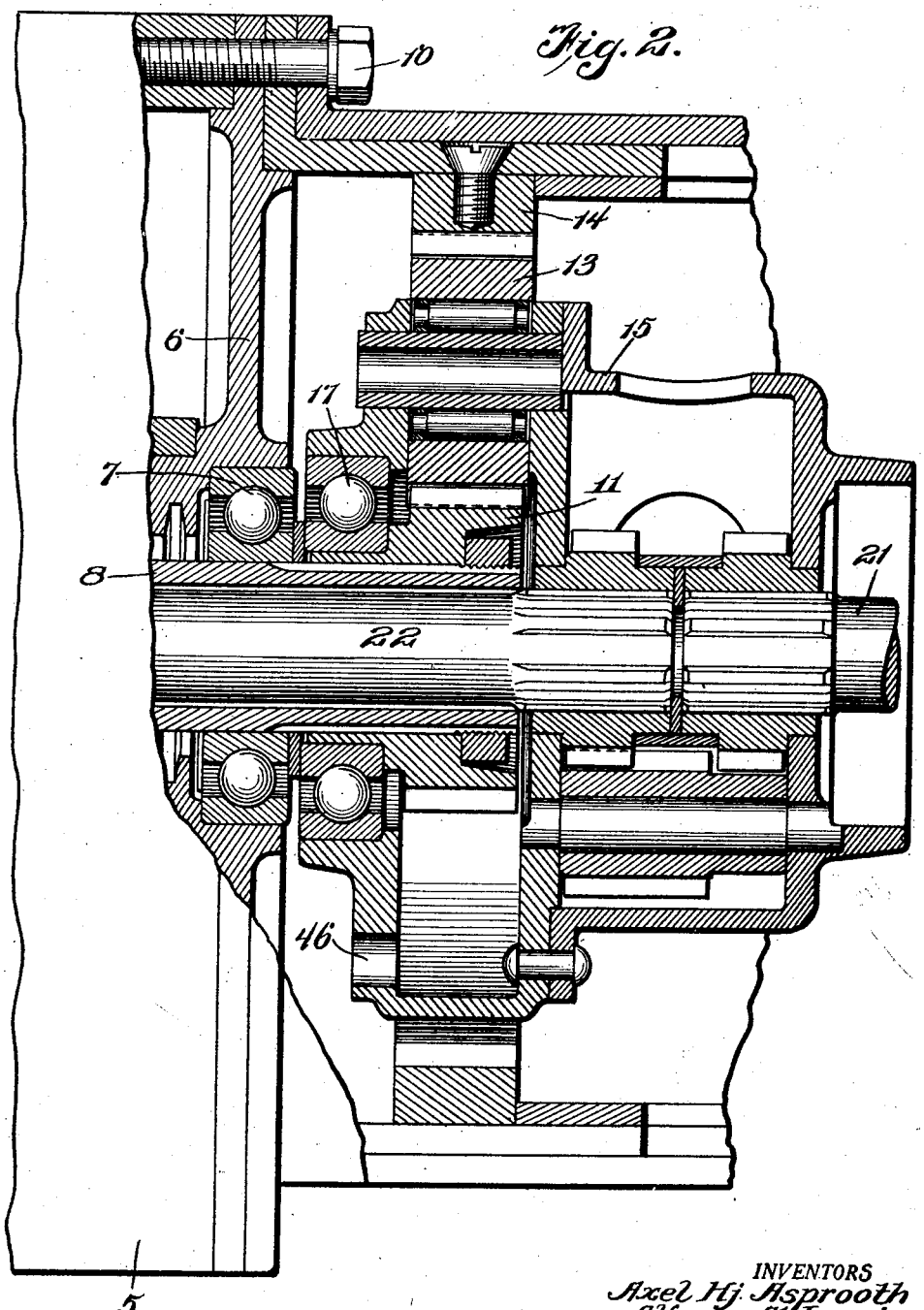

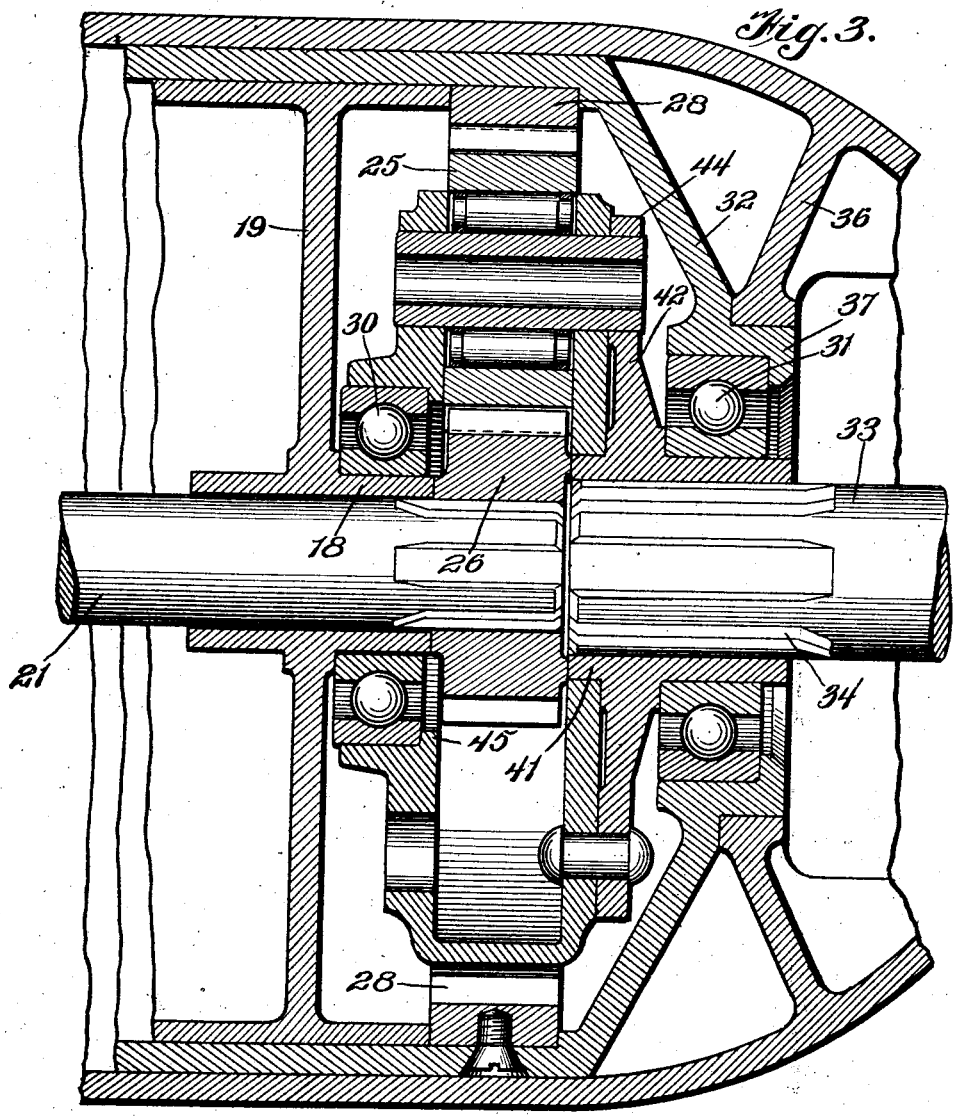

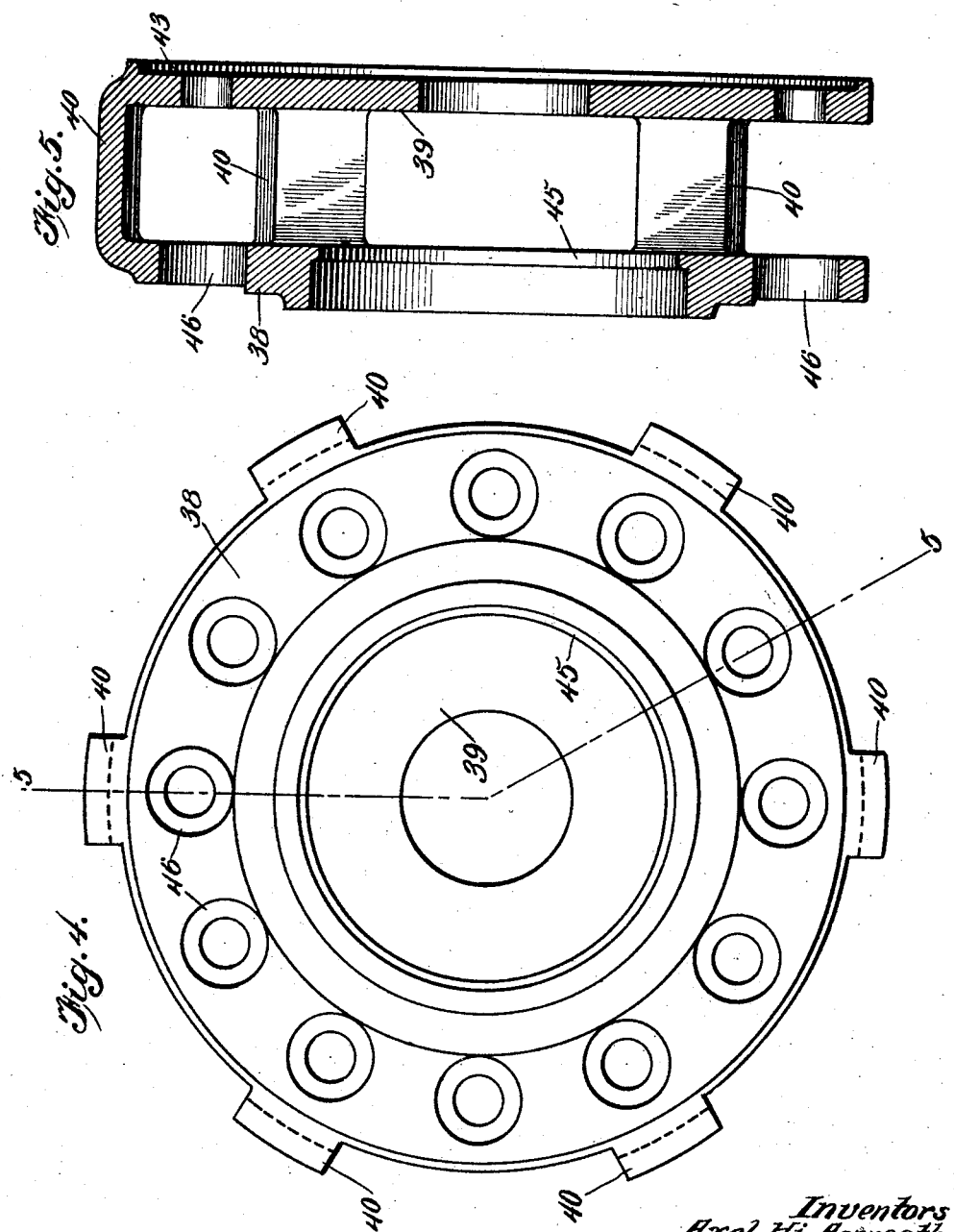

1,619,051

UNITED STATES PATENT OFFICE.

AXEL HJ. ASPROOTH, OF BALTIMORE, MARYLAND, AND ALFONSO M. LEONI, OF PHILADELPHIA, PENNSYLVANIA; SAID LEONI ASSIGNOR TO ELECTRO-MOTIVE DEVICES, INC., OF PHILADELPHIA, PENNSYLVANIA, A CORPORATION OF NEW JERSEY.

BALANCED REAR-AXLE DRIVE.

Application filed September 4, 1923. Serial No. 660,714.

The invention relates more particularly to motor carried driving axles for automotive vehicles.

The principal objects are to provide a rear axle drive whereof the elements will be fully balanced as to driving forces and will be wholly free of thrust loads; to provide a drive of the nature indicated whereof the motor and power transmission sets will be supported in co-axial alinement by a co-axial arrangement and will be independent, as to the center line support afforded by this arrangement, of the jack shafts and ground wheels; to provide a center line or co-axial arrangement of the nature indicated, embodying an electric motor supported through the medium of a hollow shaft in bearings whose use is restricted to the carriage of the motor; a first reduction gear set directly driven by the motor; a differential driven by the first reduction gear set, the differential and gear set constituting a unit that is supported in bearings wholly independent of the motor supporting bearings; and driving connections from the differential to the final drive units or second reduction gear sets, one of said driving connections extending through the motor shaft; to provide a rigid axle casing consisting of a centrally disposed motor casing and mated gear casings, including jack shaft sleeve extensions, the gear casings having webs with hub formations to co-operate with the annular bearings; to provide a construction whereof such parts as require machining may be turned in contradistinction to milling and the like expensive finishing; to provide a complete driving axle embodying in its organization standard elements capable of ready application and removal without dismantling the entire axle; and to provide spiders for the gear sets so constructed that they are universally applicable to different conditions and with different forms of connection.

We are aware that it has heretofore been proposed to provide a driving axle wherein a motor drives a co-axially supported differential, but in this case the differential drives two reduction gear sets of the single step type and arranged in the ground wheels, the shaft passing through the motor revolving at motor speed, and the motor and differential forming a unit as regards their supporting bearings, the power shafts which operate the speed reduction gears being designed to float, through their corresponding driving pinions, on the pitch lines of the gearing system. In another instance, the motor drives a gear set, forming a unit with the differential, that takes care of the total speed reduction required. Hence, the driving shaft extending through the motor shaft rotates at the wheel speed. The motor, gear set and differential are supported as a unit by the same set of bearings that otherwise would be necessary to support the motor alone.

Our invention, as indicated at the outset, is distinguished from the prior art constructions noted, in that the motor through the medium of its hollow shaft is afforded an independent means of bearing support; the first reduction gear set and the differential constitute a unit that is supported in bearings wholly independent of the motor supporting bearings; the gear sets that take care of the final reduction are supported in bearings wholly independent of those employed with the motor and the first reduction-differential unit. While the last mentioned gear sets are independent of the motor and first reduction-differential units, with respect to their supporting bearings, nevertheless they are so located that inwardly they take the driving power from the corresponding differential shafts, while they transmit this power, duly reduced as to speed, at their outer ends by means of wheel shafts of standard construction. The wheel shafts, in effect, are within the confines of the axle and are balanced at their inner ends by the outer set of bearings of the final drive units. In other words, these outer bearings also carry the load imposed upon the inner ends of the wheel shafts and tend to steady and balance them.

In the accompanying drawings,—

Figure 1 is a view principally in longitudinal section of a rear axle drive embodying features of our invention.

Fig. 2 is an enlarged sectional view of the first reduction gear set and differential unit.

Fig. 3 is a similar view of one of the second reduction gear sets.

Fig. 4 is an end view of the preferred spider construction; and

Fig. 5 is a section on line 5—5 of Fig. 4.

The conventionally illustrated motor is housed within a central casing 5 whereof the end plates 6 are provided with annular bearings 7 for the hollow motor shaft 8. The gear casings 9, which together with the motor casing form the complete axle casing, are bolted or otherwise removably and rigidly secured to the end plates 6, as at 10. The wall of the gear casings 9 are formed with comparatively large openings 9' to afford convenient access to the gearing.

The motor shaft 8 is provided, within one of the gear casings, with a motor pinion 11, which drives a first reduction gear set 12. This, by way of illustration, is represented by a planetary system of three planets 13, co-operating with the pinion 11 and with a fixed annular rack 14 formed or provided internally of the gear casing. The first reduction gear set drives a differential 15 of any approved type, the remote ends of the differential and of the gear set being centered as a unit by annular bearings 16 and 17, which it will be noted are independent of the motor supporting bearings 7. The bearing 16 is carried by the hub or shaft receiving portion 18 of a radial web 19 which may or may not be integral with the gear casing. A similar web construction 20 is present in the companion gear casing.

Operatively connected with the differential are two driving shafts 21 and 22, whereof the former drives the immediately adjacent second reduction gear set 23, and whereof the shaft 22 extends through the hollow shaft of the motor and drives the other second reduction gear set 24. It will be noted that accuracy of alinement of the driving shafts is preserved by their journals in the hub members 18 of the gear casing web formations.

The second reduction gear sets are shown by way of example as planetary systems, embodying four planets 25, which co-operate with driving pinions 26, 27, on the respective driving shafts and with fixed annular racks 28, 29 secured internally of the gear casing. The end frames or spiders for the planets are centered by annular bearings 30 and 31, the former being disposed on the hub 18 and the latter being accommodated by the driving frame of the reduction set and by the inwardly directed terminal 32 of the gear casing proper. The jack or wheel shafts 33 are detachably secured with relation to the second reduction gear sets, in the manner indicated at 34. Their sleeves or casings 35 telescope the respective gear casings and are bolted or otherwise secured to the end plates of the motor casing. They are additionally secured or supported by inwardly directed webs 36 which are afforded a bearing on a shoulder 37 of the gear casing terminal.

As shown in Figs. 4 and 5, the planet carrying spiders are of such construction that they can be readily turned instead of being formed, as heretofore, by milling. Hence, they can readily be adapted to meet standard conditions and requirements. In the preferred embodiment, they comprise confronting disc members 38 and 39 integrally joined, at their rims only, by lug-like straps 40. The disc 39 is bored to fit the hub 41 of the flange member 42, which, as shown in Fig. 3, is splined to the jack shaft, and it may or may not have the annular shoulder 43, which, when present, seats on the rim 44 of the jack shaft flange member. The bore of the disc 38 is somewhat larger to accommodate the annular bearing member and has an inner shoulder 45, which constitutes an abutment for said bearing member. The spiders have more than the required number of planet journal openings 46 in order that they may be standardized to meet any usual condition or type of connection.

Having described our invention, we claim:—

1. A rear axle drive including a motor, a first reduction gear set, a hollow shaft connecting it with the motor, a differential driven by said gear set and supported therewith, as a unit, independently of the motor support, second reduction gear sets, one on each side of the motor, driving connections between the differential and second reduction gear sets, and an axle housing with web extensions in which said driving connections are journaled and which carry one of the bearings for the differential and one of the bearings of the respective second reduction gear sets.

2. A rear axle drive including a motor, a first reduction gear set directly driven by the motor, a differential driven by said gear set and supported with it, as a unit, independently of the motor support, second reduction gear sets, one on each side of the motor, driving connections between the differential and second reduction gear sets, opposed annular bearings for each of the second reduction gear sets, and an axle housing with web extensions in which said driving connections are journaled and which carry one of the bearings for the differential and the corresponding inner bearing of the second reduction gear sets, the outer bearings of said sets functioning, in addition to supporting the load, to balance inwardly the wheel shaft end reactions.

3. The combination with a drive of the type recited, of a sectional axle housing embodying a motor casing including individual bearings for the motor, separate gear casings each carrying its own load and having webs and bearings for centering the gearing and having large openings affording easy access to the gearing, and terminal sections telescoping the gear casings.

In testimony whereof we have hereunto signed our names.

AXEL HJ. ASPROOTH.
ALFONSO M. LEONI.

CERTIFICATE OF CORRECTION.

Patent No. 1,619,051.　　　　　　　　　　　　　　Granted March 1, 1927, to

AXEL HJ. ASPROOTH ET AL.

It is hereby certified that the above numbered patent was erroneously issued to Axel Hj. Asprooth and Alfonso M. Leoni, said Leoni assignor to Electro-Motive Devices, Inc., of Philadelphia, Pennsylvania, a corporation of New Jersey, whereas said Letters Patent should have been issued to Electro-Motive Devices, Inc., of Philadelphia, Pennsylvania, a corporation of New Jersey, said corporation being assignee of the entire interest in said invention, as shown by the records of assignments in this office; and that the said Letters Patent should be read with this correction therein that the same may conform to the record of the case in the Patent Office.

Signed and sealed this 26th day of April, A. D. 1927.

Seal.
　　　　　　　　　　　　　　　　　　　　　　　M. J. Moore,
　　　　　　　　　　　　　　　　　　　Acting Commissioner of Patents.